UNITED STATES PATENT OFFICE.

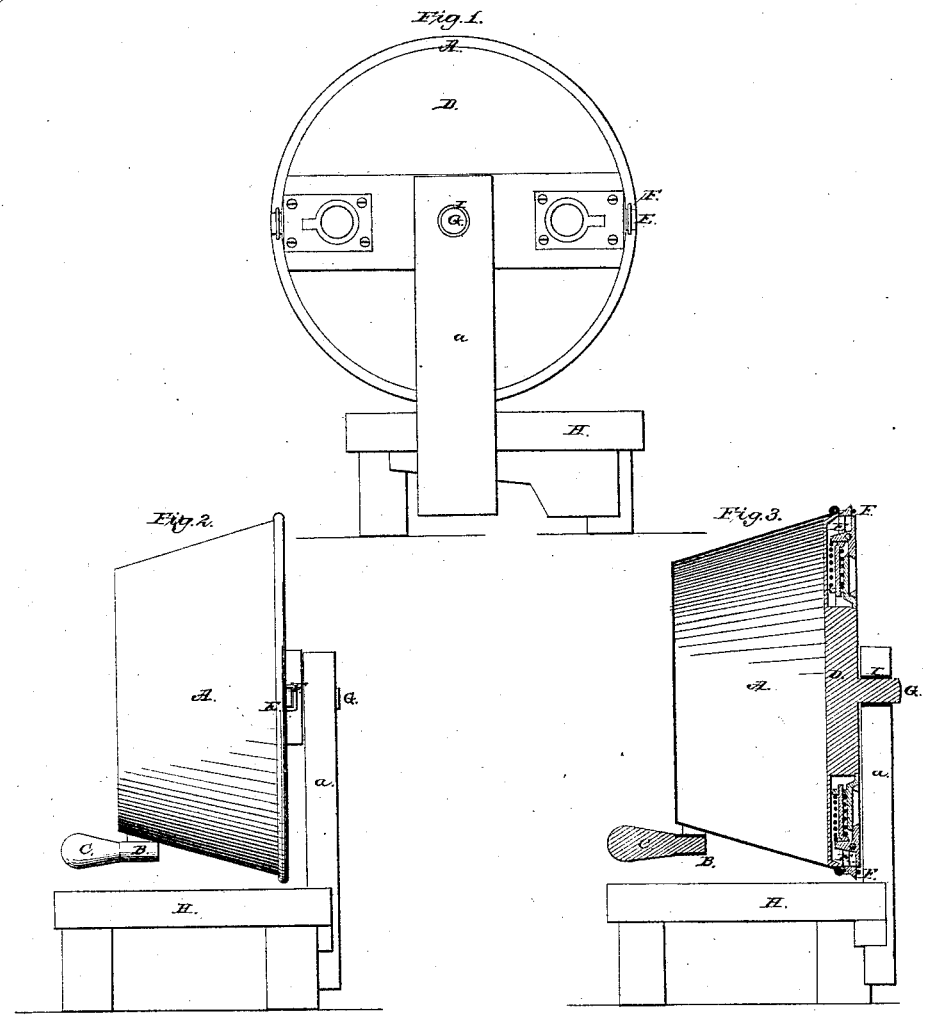

JOHN M. STANYAN, OF MILFORD, NEW HAMPSHIRE.

IMPROVED DOUGH-MIXER.

Specification forming part of Letters Patent No. 58,691, dated October 9, 1866.

*To all whom it may concern:*

Be it known that I, JOHN M. STANYAN, of Milford, in the county of Hillsborough and State of New Hampshire, have invented a new and useful or Improved Dough-Mixer; and I do hereby declare the same to be fully described in the following specification, and represented in the accompanying drawings, of which—

Figure 1 is a back view; Fig. 2, an edge elevation; and Fig. 3, a vertical section of it and its stand.

In such drawings, A is a common dish or pan, having the form of a frustum of a cone. It has a socket, B, fixed to its circumference, and near its bottom, such socket being to receive and hold a handle, C, which, when inserted in the socket, serves as a means of enabling a person to put the dish in revolution. The dish or pan is provided with a tightly-fitting cover, D, which is held in place by means of two spring-bolts, E E, and two staples, F F, the said bolts being fixed to the cover, and the said staples being fixed to the pan, so as to project beyond its edge or rim.

From the center of the cover D a cylindrical journal, G, extends in manner as represented. This journal, while the pan is supported by its stand H, is to extend into a cylindrical hole or bearing, I, made through or in the post $a$ of such stand, the bearing and its journal being of length to sufficiently support the pan or dish while charged and in rotation.

By putting flour, with a proper amount of water, in the pan, and afterward fixing the cover and handle in place with respect to the pan and inserting the journal in its bearing in the stand, we have only to apply one hand to the handle and impart a rotary motion to the pan in order to convert the flour and water into dough.

The pan and its adjuncts—viz., the handle and its socket and the cover and its journal—are intended to constitute a cheap and efficient means of mixing flour and water for the making of dough, the pan when without the handle and cover, or without the handle only, being useful for other purposes.

The arrangement of the handle-socket enables the pan to rest on its bottom on a table or shelf. Had the pan a cranked shaft extending from the center of its bottom, such shaft and its crank would be in the way of using the pan for purposes other than the making of dough.

I have found a dough-mixer constructed in my improved manner to be very useful and highly efficient in operation.

I am aware that a drum with rotary stirrers or mixers has been used as a means of mixing flour and water or other liquid for the purpose of converting such into dough. Therefore I do not claim such as my invention; nor do I claim either of the parts of my mixer when separately considered.

I claim—

The improved dough-mixer, made substantially as described, viz., of the pan and cover, with the handle-socket and the journal applied and arranged in manner as specified, such cover and pan being provided with suitable connections, as set forth.

JOHN M. STANYAN.

Witnesses:
R. H. EDDY,
F. P. HALE, Jr.